United States Patent [19]

Yagi

[11] Patent Number: 5,416,631
[45] Date of Patent: May 16, 1995

[54] LIGHT SHUTTER ARRAY

[75] Inventor: Tsukasa Yagi, Kobe, Japan

[73] Assignee: Minolta Camera Kabushiki Kaisha, Osaka, Japan

[21] Appl. No.: 998,723

[22] Filed: Dec. 30, 1992

[30] Foreign Application Priority Data

Jan. 9, 1992 [JP] Japan .................. 4-002154

[51] Int. Cl.6 .................. G02F 10/01; G02F 1/03
[52] U.S. Cl. .................. 359/254; 359/276; 372/12
[58] Field of Search .............. 359/245, 254, 276, 894; 369/118, 119; 372/12

[56] References Cited

U.S. PATENT DOCUMENTS

| | | | |
|---|---|---|---|
| 4,744,640 | 5/1988 | Phillips | 359/276 |
| 4,802,741 | 2/1989 | Kaukeinen | 359/254 |
| 4,854,678 | 8/1989 | Kitano et al. | |
| 4,887,104 | 12/1989 | Kitano et al. | |
| 4,993,811 | 2/1991 | Blazey et al. | 359/254 |
| 5,011,271 | 4/1991 | Saito et al. | |
| 5,024,511 | 6/1991 | Matsubara et al. | |
| 5,155,618 | 10/1992 | Matsubara et al. | 359/245 |
| 5,262,888 | 11/1993 | Morishita et al. | 359/245 |

*Primary Examiner*—Nelson Moskowitz
*Attorney, Agent, or Firm*—Burns, Doane, Swecker & Mathis

[57] ABSTRACT

A light shutter array to be employed in an optical head for a color display, a color printer or the like. The light shutter array has at least three lines of shutter elements which are made of a material having an electrooptic effect. In tile lines, shutter elements which have conductor-filmed windows and shutter elements which have bare windows are staggered. The shutter elements with bare windows function as light shutters, and the shutter elements with conductor-filmed windows function as electrodes. The shutter elements with bare windows in each line are driven in accordance with red, green or blue image data.

9 Claims, 7 Drawing Sheets

LIGHT SHUTTER ARRAY

BACKGROUND OF THE INVENTION

1. Field of the Invention

The present invention relates to a light shutter array to be employed in an optical head for a color display, a color printer or the like, and more particularly to a light shutter array which comprises a plurality of lines of shutter elements made of a material having an electrooptic effect.

2. Description of Related Art

A conventionally well-known light shutter array is one which comprises two lines of shutter elements made of a material having an electrooptic effect such as PLZT. When the light shutter array is employed in an optical head for a color display or the like, a color filter panel is required. Since the light shutter array has only two lines of shutter elements, the color filter panel covering the light shutter array must have a structure wherein red filters, green filters and blue filters are arranged such that any three consecutive shutter elements in each line are covered with a red, a green and a blue filter respectively. The structure of the color filter panel is complicated, and therefore the color filter panel is costly. Further, the color filter panel is difficult to be set in a right place when it is installed. Thus, it is difficult to use the light shutter array in an optical head for a color display or the like.

SUMMARY OF THE INVENTION

An object of the present invention is to provide a light shutter array which can be easily used in an optical head for a color display, a color printer or the like.

In order to attain the object, a light shutter array according to the present invention comprises at least three lines of shutter elements, and in tile lines, shutter elements which have conductor-filmed windows and shutter elements which have bare windows are staggered.

When the light shutter array is to be used in an optical head for a color display, since the light shutter array has at least three lines of shutter elements, a color filter panel used together with the light shutter array is only required to have a structure wherein a red area, a green area and a blue area are arranged so as to face to the respective lines of shutter elements. Thus, the light shutter array according to the present invention requires a color filter panel with a simple structure, not a complicated one, when it is used for a color display.

The shutter elements with bare windows function as light shutters, and the shutter elements with conductor-filmed windows function as electrodes. The shutter elements functioning as light shutters can be easily connected to an external circuit via the shutter elements functioning as electrodes.

BRIEF DESCRIPTION OF THE DRAWINGS

This and other objects and features of the present invention will be apparent from the following description with reference to tile accompanying drawings in which.

DETAILED DESCRIPTION OF THE PREFERRED EMBODIMENTS

An exemplary light shutter array according to the present invention and a manufacturing process thereof are hereinafter described with reference to the accompanying drawings.

Figure 1:
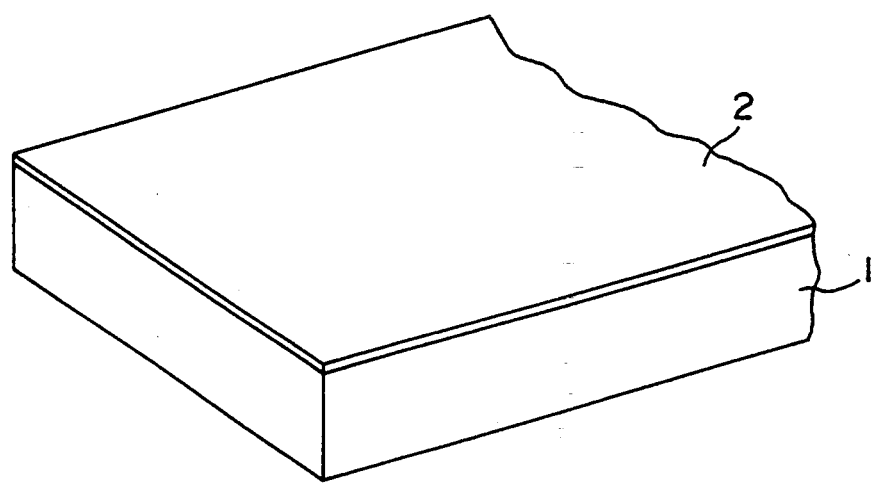
FIG. 1 is a fragmentary perspective view of a light shutter array which is an embodiment of the present invention, showing a step of a manufacturing process thereof.

First referring to FIG. 1, a surface of a rectangular base plate 1 is coated with a resist film 2 with a thickness of 1 $\mu$m by spin-coating or the like. The base plate 1 is made of a material having an electrooptic effect such as PLZT, and the upper surface and the lower surface of the base plate 1 are in advance polished to transmit light.

Figure 2:
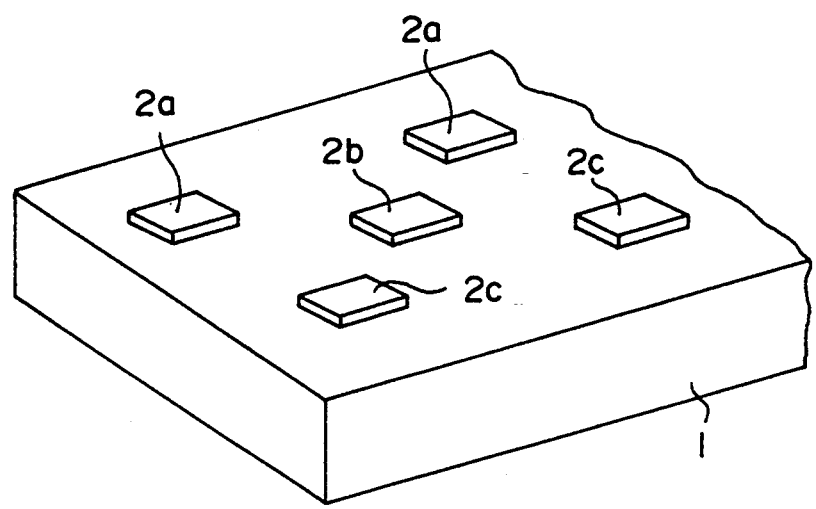
FIG. 2 is a fragmentary perspective view of the light shutter array, showing a step of the manufacturing process subsequent to the step shown in FIG. 1.

Next, as shown in FIG. 2, the resist film 2 is removed from the surface of the base plate 1 by photolithography except for portions corresponding to windows of shutter elements 10 which will function as light shutters. Each of the portions 2a, 2b and 2c on which the resist film 2 is left is a rhombus which has sides of 80 $\mu$m. The rhombus resist-filmed portions 2a, 2b and 2c are in three lines along the longer side of the rectangular base plate 1 and staggered.

Figure 3:
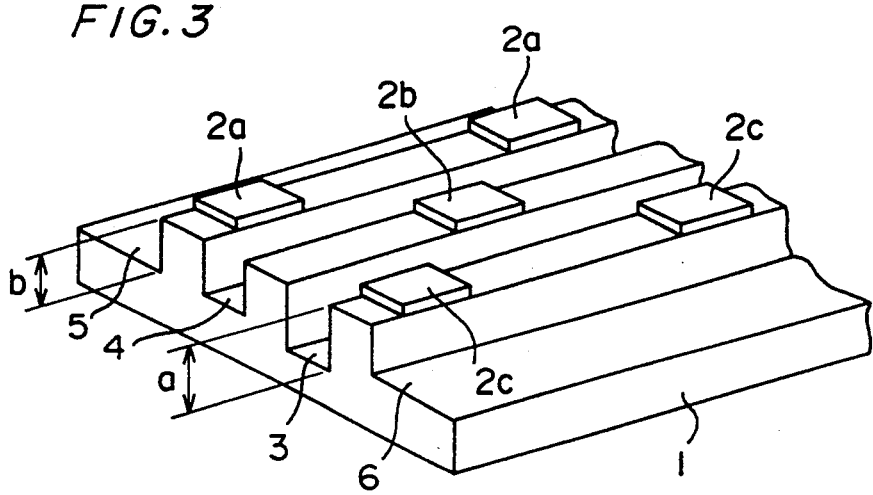
FIG. 3 is a fragmentary perspective view of the light shutter array, showing a step of the manufacturing process subsequent to the step shown in FIG. 2.

Next, as shown in FIG. 3, a portion of the base plate 1 between the line of resist-filmed portions 2b and the line of resist-filmed portions 2c is cut from one end to the other along the longer side of the base plate 1 and becomes a common electrode groove 3. The cutting is made by a dicing saw which has a positioning accuracy of 5 $\mu$m, and a diamond cutter which has a thickness of 25 $\mu$m is used as the tooth of the dicing saw. The groove 3 has a width of 80 $\mu$m and a depth a of 150 $\mu$m. The depth a is measured from the surface of the base plate 1. Likewise, a portion of the base plate 1 between the line of resist-filmed portions 2a and the line of resist-filmed portions 2b is cut along the longer side of the base plate 1 and becomes a groove 4. The groove 4 has a width of 80 $\mu$m and a depth b of 110 $\mu$m. The outside portion of the lines of resist-filmed portions 2a and the outside portion of resist-filmed portions 2c are cut along the longer side of the base plate 1 and become individual electrode steps 5 and 6 respectively. The steps 5 and 6 have the depth b of 110 $\mu$m. The resist-filmed portions 2a, 2b and 2c may be made to have any shape, and the grooves 3, 4 and the steps 5, 6 may be made to have any depth in accordance with the desired performance of the light shutter array and within the machining accuracy. It is to be noted that an indispensable condition is that the depth a is larger than the depth b.

Figure 4:
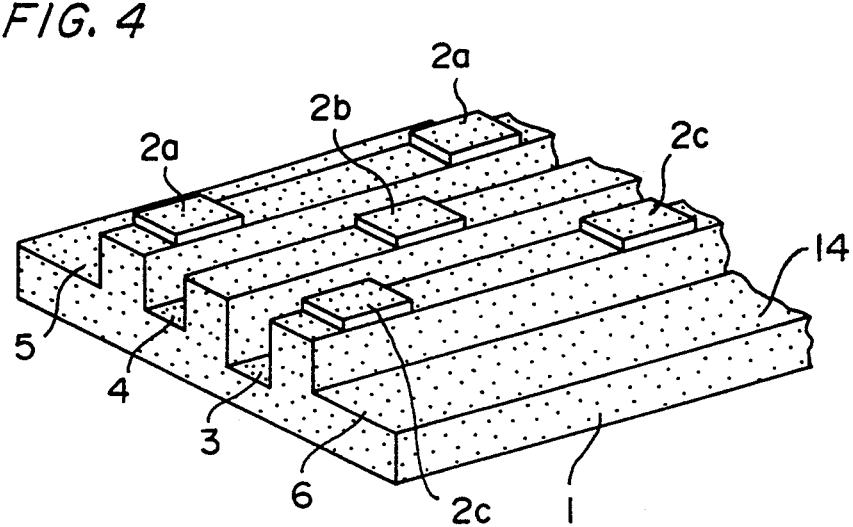
FIG. 4 is a fragmentary perspective view of the light shutter array, showing a step of tile manufacturing process subsequent to the step shown in FIG. 3.
Figure 5:
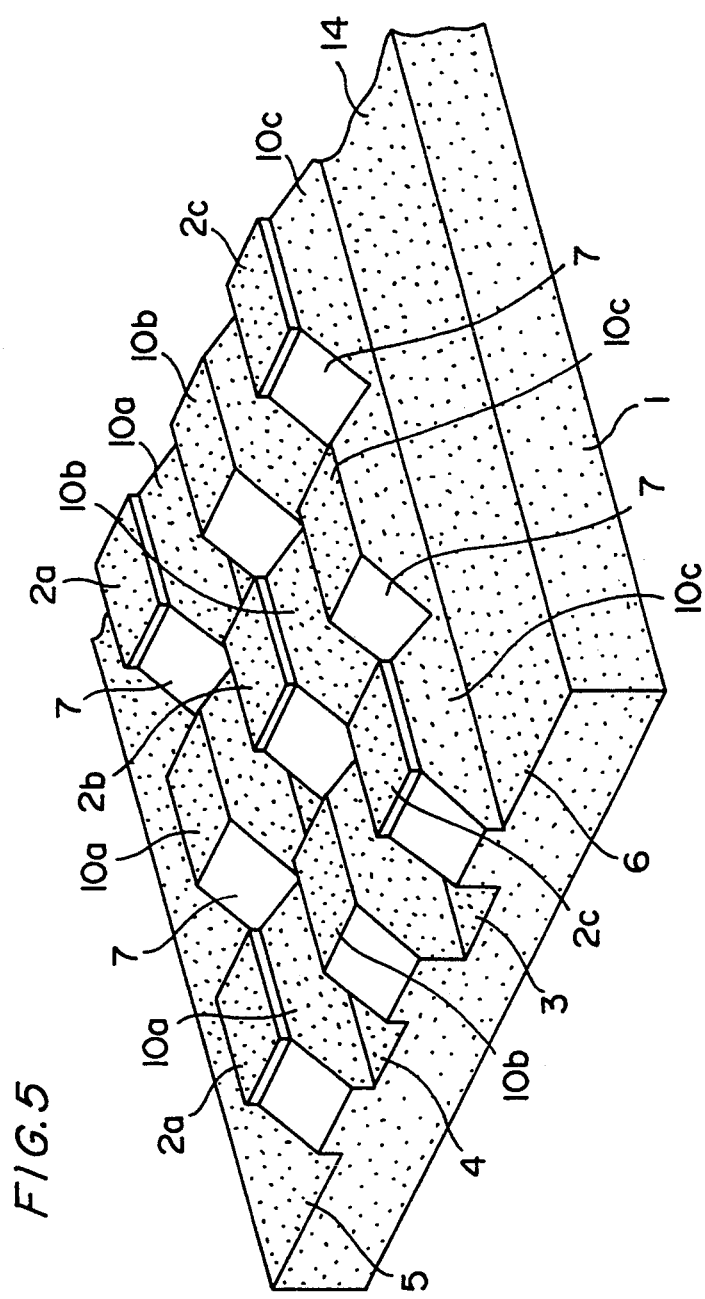
FIG. 5 is a fragmentary perspective view of the light shutter array, showing a step of the manufacturing process subsequent to the step shown in FIG. 4.

Subsequently, as shown in FIG. 4, the base plate 1 and the resist-filmed portions 2a, 2b and 2c are entirely coated with a conductor 14 by spattering or the like. The conductor 14 is, for example, aluminum. Then, as shown in FIG. 5, notches 7 are made by a diamond cutter which has an edge angle of 60 degrees and a thickness of 200 μm at the portion between the grooves 3 and 4, at the portion between the groove 3 and the step 6 and at tile portion between the groove 4 and the step 5. In this way, shutter elements 10a, 10b and 10c are preliminary separated. The notches 7 are made so as to be parallel to sides of the respective resist films 2a, 2b and 2c.

Figure 6:
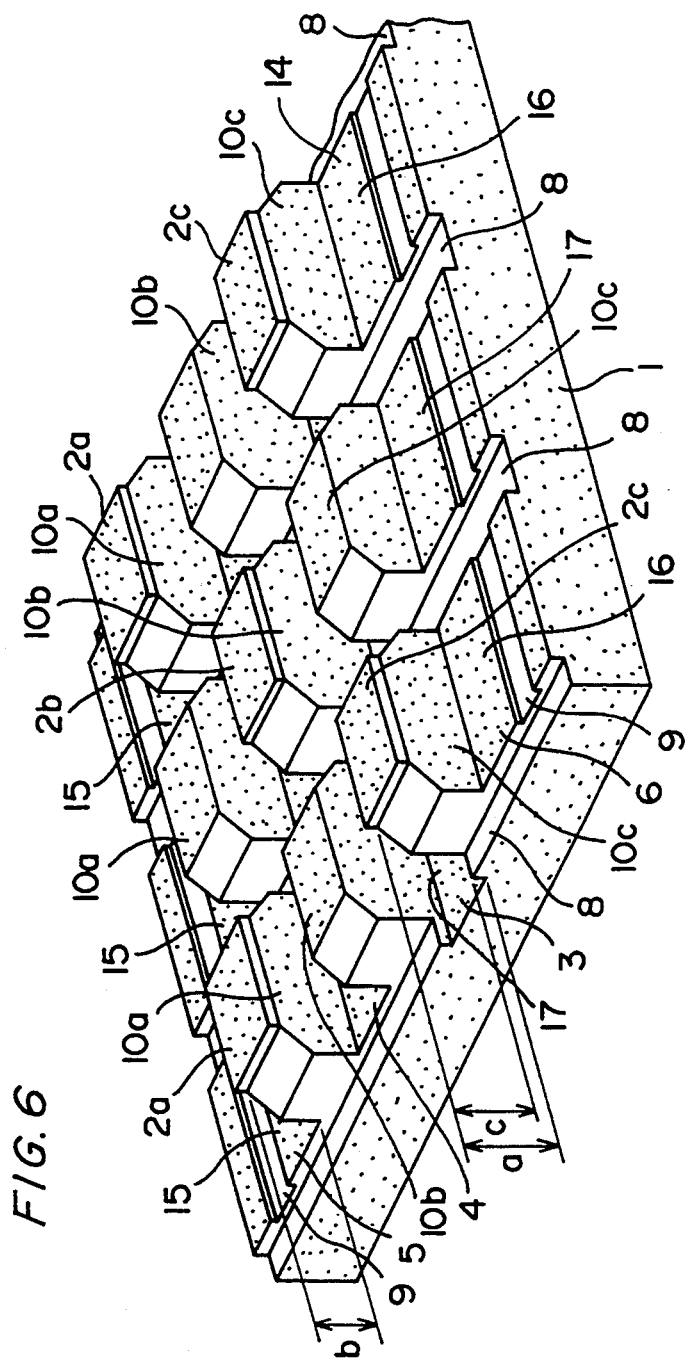
FIG. 6 is a fragmentary perspective view of the light shutter array, showing a step of the manufacturing process subsequent to the step shown in FIG. 5.

Now referring to FIG. 6, the portions where the notches 7 are made are cut to have a depth c of 130 μm from one end to the other along the shorter side of the base plate 1 by a diamond cutter which has a thickness of 15 μm. The cut portions become individual electrode dividing grooves 8. The depth c is smaller than the depth a of the groove 3 and larger than the depth b of the groove 4 and the steps 5 and 6. Accordingly, the conductor 14 coated on the groove 4, and the steps 5 and 6 are removed where they cross the grooves 8. Thereby, the groove 4 and tile steps 5 and 6 are divided to couple with the respective shutter elements 10a, 10b and 10c, and the divided steps 5 and 6 will function as individual electrodes 15 and 16. On tile other hand, the conductor 14 coated on the groove 3 is wholly left thereon and will function as a common electrode 17. Further, grooves 9 are made along the longer side of the base plate 1 so as to divide the individual electrodes 15 and 16 from the common electrode 17.

Figure 7:
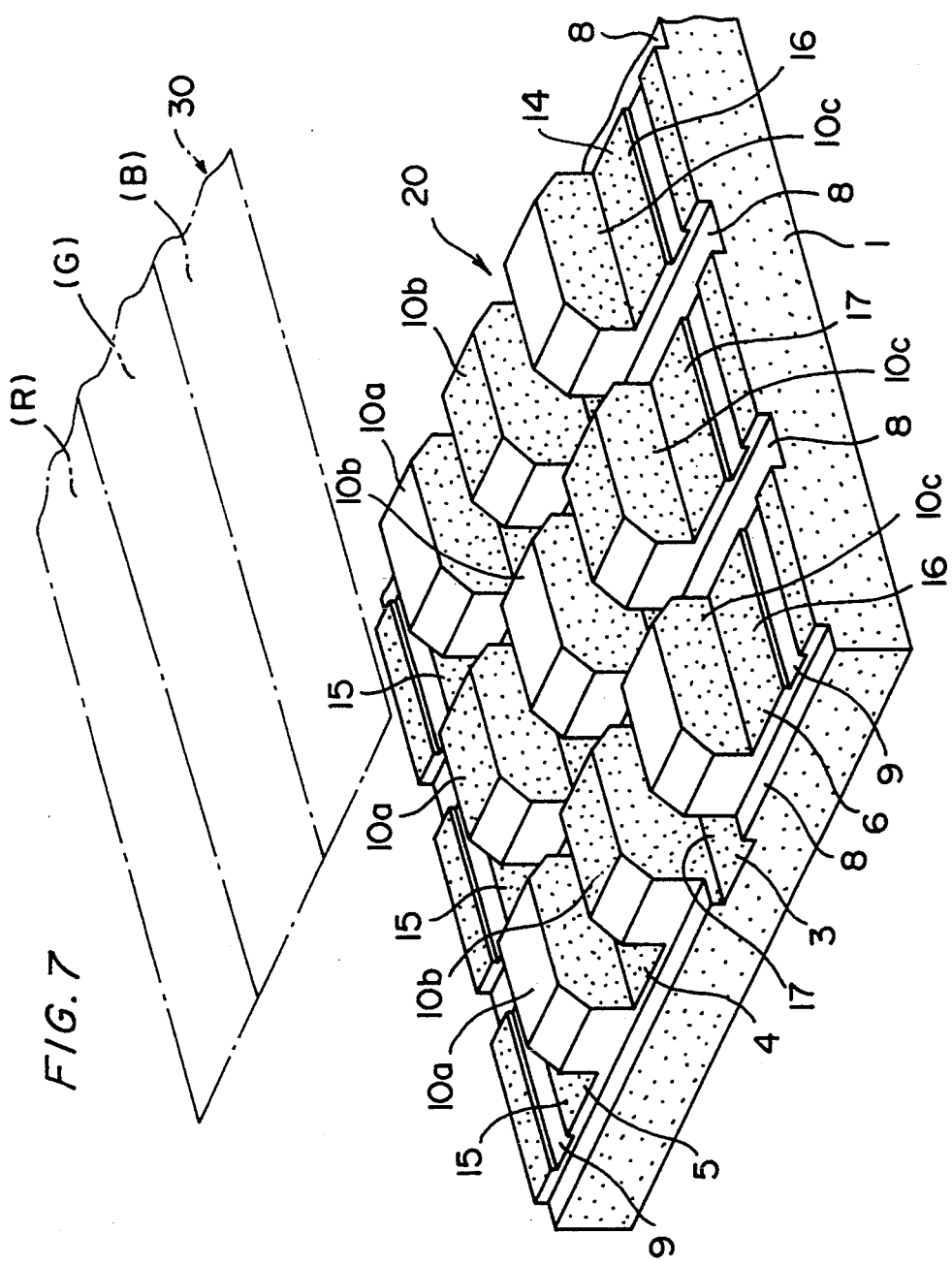
FIG. 7 is a fragmentary perspective view of the light shutter array finished through the manufacturing process.
Figure 8:
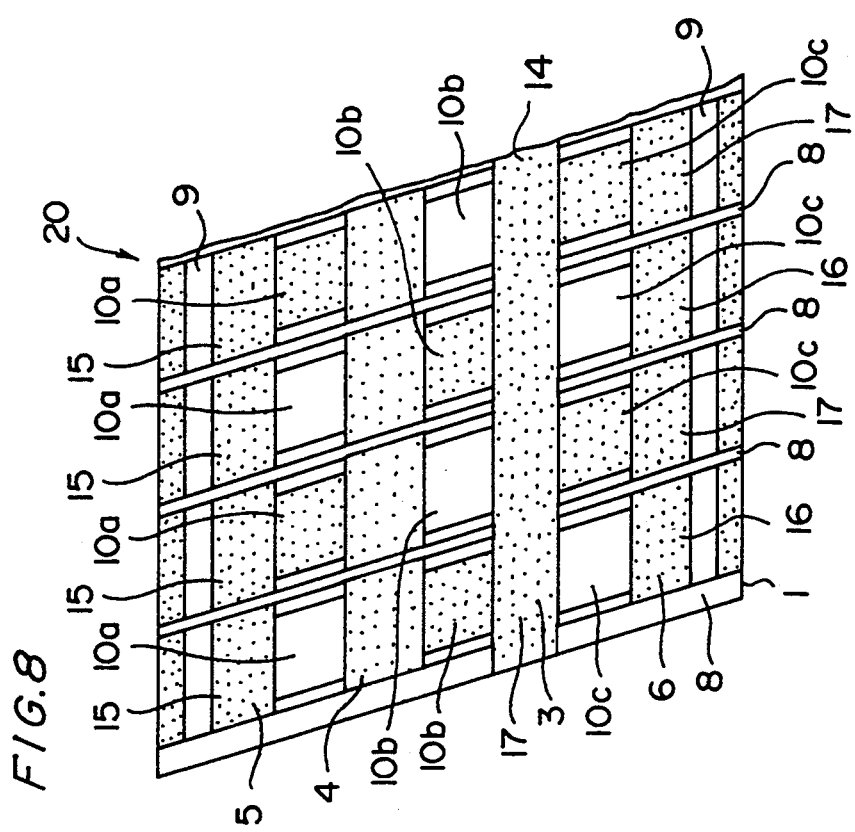
FIG. 8 is a fragmentary plan view of the finished light shutter array.

Next, referring to FIGS. 7 and 8, the conductor 14 coated on the portions 2a, 2b and 2c is removed together with the resist film 2 from the corresponding shutter elements 10a, 10b and 10c. More specifically, by using a resist remover, the conductor 14 coated on the resist-filmed portions 2a, 2b and 2c is removed together with the resist film 2 (lift-off method). There are other ways of removing the conductor 14 besides the way wherein the resist film is used. A possible way is coating the base plate 1 directly with a metal film and then partly removing the metal film by polishing.

The finished through tile process is a light shutter array 20 which has light shutter elements 10a, 10b and 10c arranged in three lines along the longer side of the base plate 1. Each shutter element is solid and has a rhombus upper window. In the three lines, shutter elements which have bare windows and shutter elements which have conductor-filmed windows are staggered. The shutter elements with bare windows function as light shutters as they do by nature, and the shutter elements with conductor-filmed windows function as electrodes.

The common electrode 17 is formed on the groove 3 between the line of shutter elements 10b and the line of shutter elements 10c and extends to the side surfaces of the base plate 1. The individual electrodes 15 and 16 are disposed at both sides of the three lines of shutter elements 10a, 10b and 10c. The individual electrodes 15 and 16 are divided from the common electrode 17 by the grooves 9 made at tile both side end portions of tile upper surface of the base plate 1.

A shutter element 10a which functions as a light shutter is connected with the individual electrode 15 at the outward side and is connected with the common electrode 17 at the inward side via the neighboring shutter element 10b with a conductor-filmed window. A shutter element 10b which functions as a light shutter is connected with the individual electrode 15 at one side via the neighboring shutter element 10a with a conductor-filmed window and is connected with the common electrode 17 at the other side. A shutter element 10c which functions as a light shutter is connected with the individual electrode 16 at tile outward side and is connected with the common electrode 17 at tile inward side.

Figure 9:
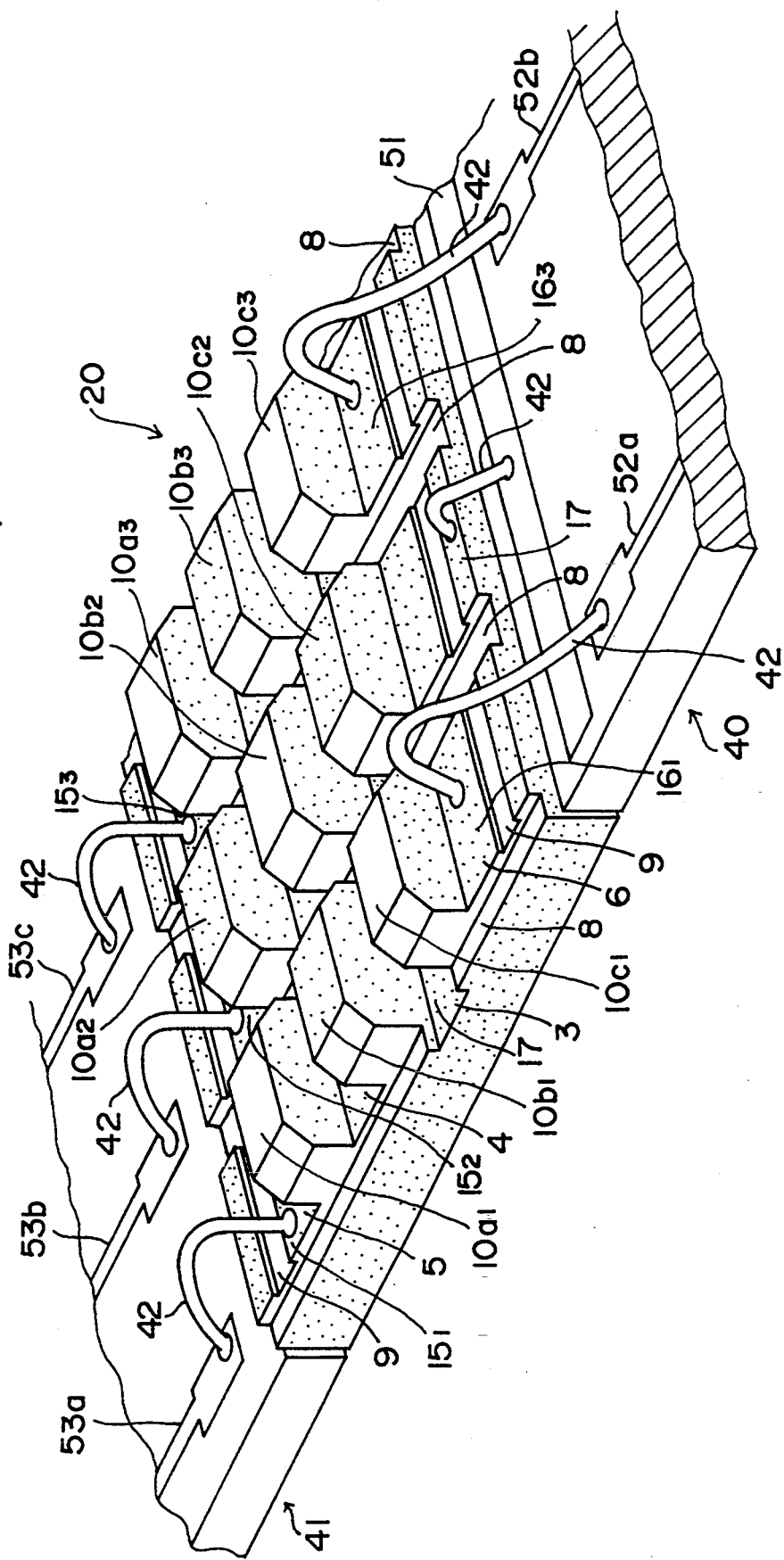
FIG. 9 is a fragmentary perspective view of the finished light shutter array showing connections between the light shutter array and external circuits.

In order to drive the light shutter array 20, the individual electrodes 15, 16 and the common electrode 17 must be connected with external circuits. Referring to FIG. 9, an exemplary structure for the electrical connections is hereinafter described.

Printed circuit boards 40 and 41 are disposed at both sides of the light shutter array 20. The printed circuit board 40 has circuit patterns 51, 52a and 52b on a surface, and the printed circuit board 41 has circuit patterns 53a, 53b and 53c on a surface. The individual electrodes $15_1$, $15_3$, $16_1$ and $16_3$ of the respective shutter elements $10a_1$, $10a_3$, $10c_1$ and $10c_3$ which function as light shutters are electrically connected with tile circuit patterns 53a, 53c, 52a and 52b by lead wires 42 at the steps 5 and 6. Since the areas of the steps 5 and 6 are large, the electrical connections can be made in large operation spaces. This permits very easy operation for the electrical connections between the individual electrodes $15_1$, $15_3$, $16_1$, $16_3$ and the circuit patterns 53a, 53c, 52a, 52b.

The individual electrode $15_2$ of the shutter element $10b_2$ is electrically connected with the circuit pattern 53b by a lead wire 42 at tile step 5. More specifically, the conductor-filmed window of the shutter element $10a_2$ enables tile individual electrode $15_2$ of the shutter element $10b_2$ which is in tile middle line and functions as a light shutter to extend to the step 5. In this way, any light shutter in the middle line can be electrically connected with a circuit pattern by a lead wire at the step 5. This eliminates the necessity of connecting an individual electrode with a circuit pattern at the narrow groove 4 between the lines of shutter elements 10a and 10b, and facilitates operation for an electrical connection between a light shutter in the middle line and a circuit pattern.

The common electrode 17 of the light shutters $10a_1$, $10a_3$, $10b_2$, $10c_1$ and $10c_3$ extends to a side end portion of the base plate 1, and the common electrode 17 is electrically connected with the circuit pattern 51 by a lead wire 42 at the side end portion. This eliminates the necessity of connecting the common electrode 17 with the circuit pattern 51 at the narrow groove 3 between the lines of shutter elements 10b and 10c, and facilitates operation for the electrical connection between the common electrode 17 and the circuit pattern 51.

Further, each lead wire 42 is fixed on the corresponding individual electrode or common electrode and circuit pattern by wire bonding.

The thus structured light shutter array 20 is combined with a color filter panel 30 so as to fabricate an optical head for a color display. In this embodiment, the light shutter array 20 is employed in an optical head for a color display, but it may be employed in a print head for a color printer. As shown in FIG. 7, the color filter panel 30 is of a shape to cover the three lines of shutter elements 10a, 10b and 10c of the light shutter array 20, that is, the color filter panel 30 is rectangular. The panel 30 has three strips of red (R), green (G) and blue (B) which reach along its longer side. This color filter panel 30 has a simple structure compared with a conventional one. When fastening the color filter panel 30 to the light shutter array 20, the positioning only with respect to the widthwise direction must be accurately done, and accurate positioning with respect to the lengthwise direction is not required. The color filter panel 30 is disposed facing to the lines of shutter elements 10a, 10b and 10c. Light transmitted through the shutter elements 10a penetrates a red (R) transmission type filter to be changed into red light. Light transmitted through the shutter elements 10b penetrates a green (G) transmission type filter to be changed into green light. Light transmitted through the shutter elements 10c penetrates a blue (B) transmission type filter to be changed into blue light. Therefore by driving the shutter elements 10a, 10b and 10c which function as light shutters individually in accordance with image data indicating red, green or blue, a color picture is obtained on the display.

Although the present invention has been described in connection with the preferred embodiment above, it is to be noted that various changes and modifications are possible to those who are skilled in the art.

What is claimed is:

1. A light shutter array including a plurality of light shutter elements made of a material having an electro-optic effect, said light shutter array comprising:

a first line of light shutter elements;

a second line of light shutter elements provided in parallel with said first line, said second line including light shutter elements with conductor-filmed windows and light shutter elements with bare windows, each of said light shutter elements with conductor-filmed windows being disposed between said light shutter elements with bare windows;

a third line of light shutter elements provided between said first line and said second line in parallel therewith, said third line including light shutter elements with conductor-filmed windows and light shutter elements with bare windows, each of said light shutter elements with bare windows in said third line being adjacent to one of said light shutter elements with conductor-filmed windows in said second line;

a common electrode provided between said first line and said third line, said common electrode being directly connected with the light shutter elements in said first line and in said third line and being connected with the light shutter elements with bare windows in said second line via the light shutter elements with conductor-filmed windows in said third line;

first individual electrodes provided at an opposite side of said first line to said third line, said first individual electrodes being connected with the light shutter elements in said first line individually; and second individual electrodes provided at a side of said second line that is opposite to said third line, said second individual electrodes including electrodes which are directly connected individually with the light shutter elements with bare windows in said second line and electrodes which are connected individually with the light shutter elements with bare windows in said third line via the light shutter elements with conductor-filmed windows in said second line.

2. The light shutter array as claimed in claim 1, wherein said light shutter elements with conductor-filmed windows and said light shutter elements with bare windows are staggered.

3. The light shutter array as claimed in claim 1, wherein said light shutter elements are made of PLZT.

4. A light shutter array including a plurality of light shutter elements made of a material having an electro-optic effect, said light shutter array comprising:

a first line of light shutter elements;

a second line of light shutter elements provided in parallel with said first line, said second line including light shutter elements with conductor-filmed windows and light shutter elements with bare windows, each of said light shutter elements with conductor-filmed windows being disposed between said light shutter elements with bare windows;

a third line of light shutter elements provided between said first line and said second line in parallel therewith, said third line including light shutter elements with conductor-filmed windows and light shutter elements with bare windows, each of said light shutter elements with bare windows in said third line being adjacent to one of said light shutter elements with conductor-filmed windows in said second line;

a plurality of first electrodes provided on a side of said second line that is opposite to said third line, which are directly connected individually with the light shutter elements with bare windows in said second line; and a plurality of second electrodes provided on the side of said second line opposite to said third line, which are connected individually with the light shutter elements with bare windows in said third line via the light shutter elements with conductor-filmed windows in said second line.

5. The light shutter array as claimed in claim 4, wherein said light shutter elements with conductor-filmed windows and said light shutter elements with bare windows are staggered.

6. The light shutter array as claimed in claim 4, wherein said light shutter elements are made of PLZT.

7. A light shutter array including a plurality of light shutter elements made of a material having an electro-optic effect, said light shutter array comprising:

a first line of light shutter elements;

a second line of light shutter elements provided in parallel with said first line, said second line including light shutter elements with conductor-filmed windows and light shutter elements with bare windows which are arranged alternately;

a third line of light shutter elements provided between said first line and said second line in parallel therewith, said third line including light shutter elements with conductor-filmed windows and light shutter elements with bare windows which are arranged alternately, said light shutter elements with bare windows in said third line being adjacent to said light shutter elements with conductor-filmed windows in said second line;

a common electrode provided between said first line and said third line, said common electrode being directly connected with the light shutter elements in said first line and in said third line and being connected with the light shutter elements with bare windows in said second line via the light shutter elements with conductor-filmed windows in said third line;

first individual electrodes provided at a side of said first line that is opposite to said third line, said first individual electrodes being individually connected with the light shutter elements in said first line; and second individual electrodes provided at a side of said second line that is opposite to said third line, said second individual electrodes including electrodes which are directly connected individually with the light shutter elements with bare windows in said second line and electrodes which are connected individually with the light shutter elements with bare windows in said third line via the light shutter elements with conductor-filmed windows in said second line.

8. The light shutter array as claimed in claim 7, wherein said light shutter elements are staggered.

9. The light shutter array as claimed in claim 7, wherein said light shutter elements are made of PLZT.

* * * * *